Dec. 15, 1936. J. WOLKOFF 2,064,583
DYNAMO-ELECTRIC MACHINE
Filed April 24, 1934 5 Sheets-Sheet 1

INVENTOR
John Wolkoff
BY
Kenyon & Kenyon
ATTORNEYS

Dec. 15, 1936.  J. WOLKOFF  2,064,583
DYNAMO-ELECTRIC MACHINE
Filed April 24, 1934  5 Sheets-Sheet 2
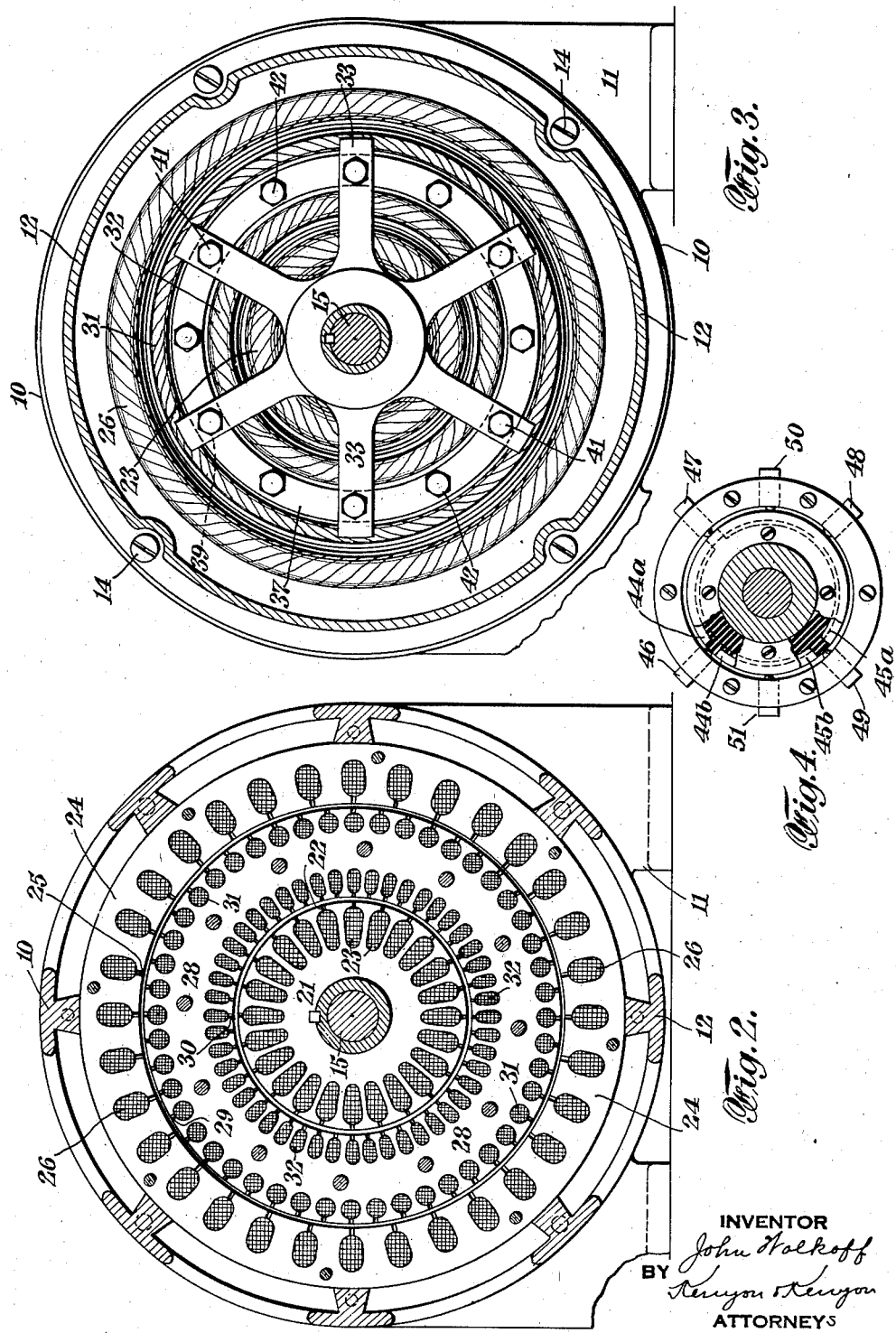
INVENTOR
John Wolkoff
BY
Kenyon & Kenyon
ATTORNEYS Dec. 15, 1936.  J. WOLKOFF  2,064,583
DYNAMO-ELECTRIC MACHINE
Filed April 24, 1934    5 Sheets-Sheet 4
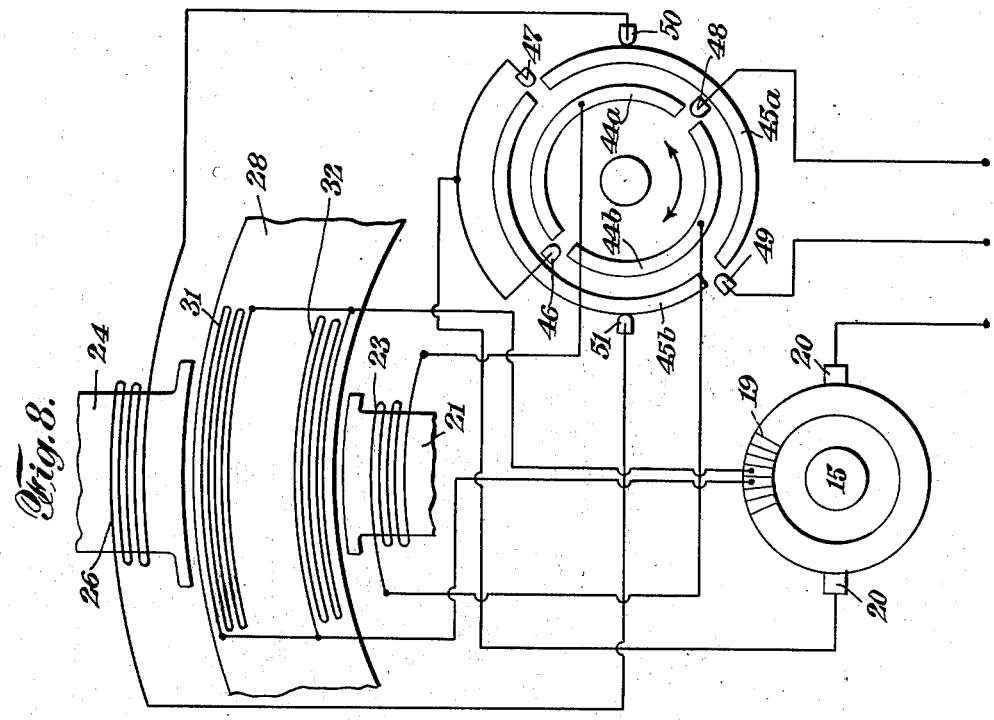
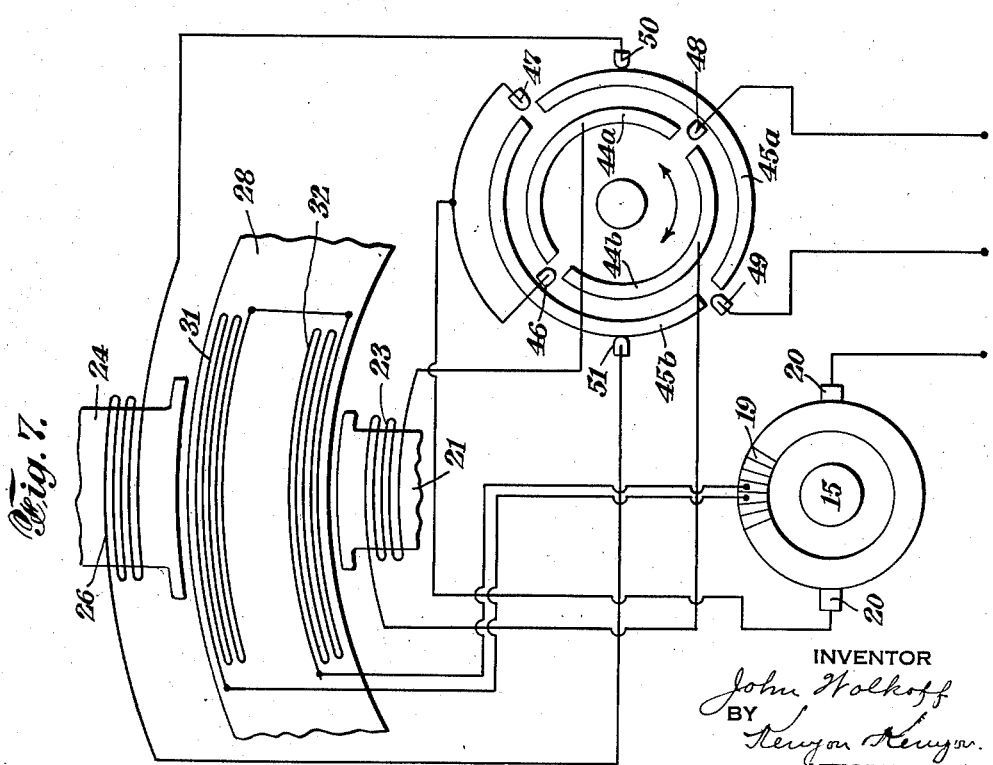
INVENTOR
John Wolkoff
BY
Kenyon & Kenyon
ATTORNEYS

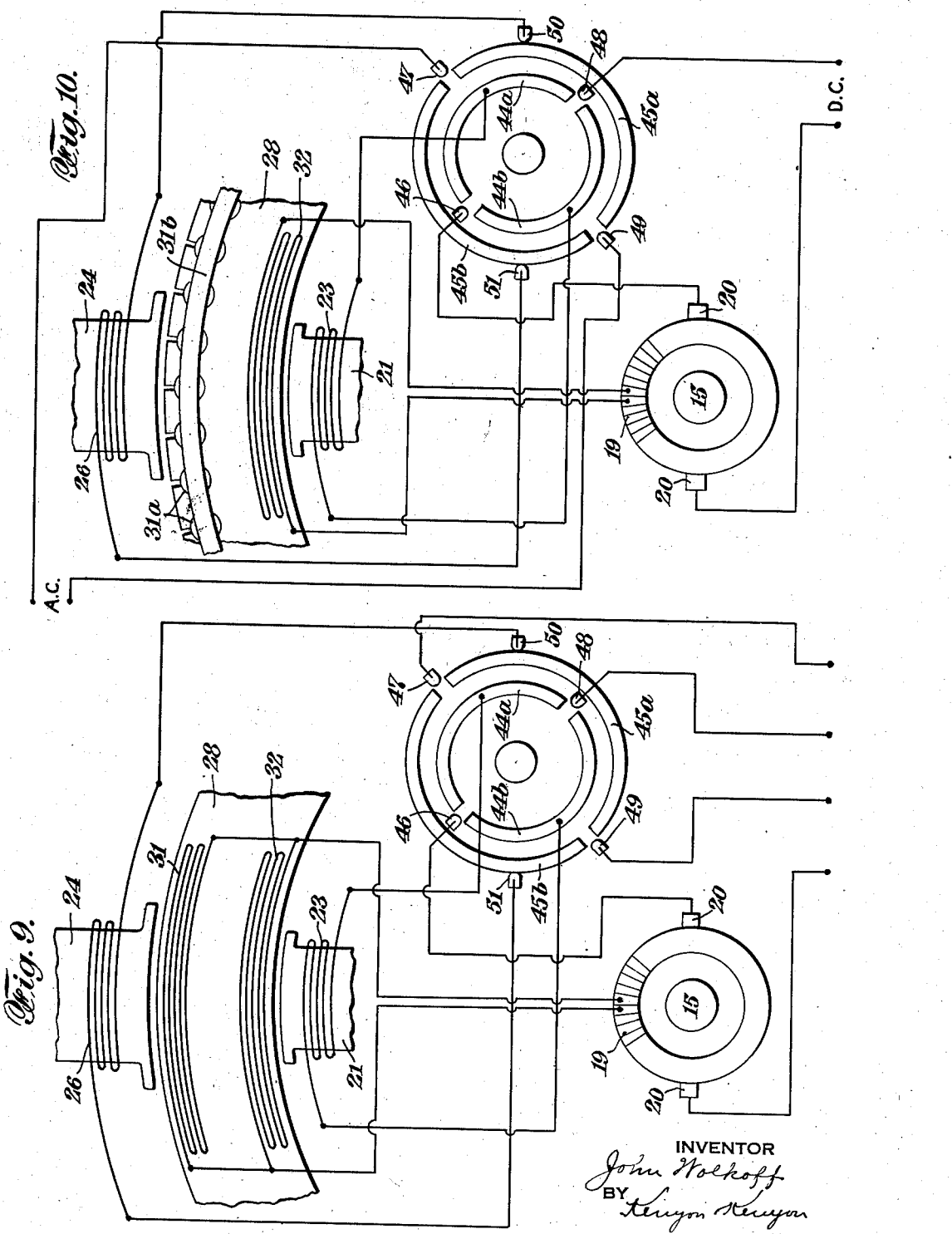

Patented Dec. 15, 1936

2,064,583

UNITED STATES PATENT OFFICE 2,064,583

DYNAMO-ELECTRIC MACHINE

John Wolkoff, Newark, N. J.

Application April 24, 1934, Serial No. 722,116

12 Claims. (Cl. 171—252)

This invention relates to dynamo electric machines and more particularly to improvements in dynamo electric machines of the type disclosed in my Patent No. 1,856,146 in which the armature is arranged between two relatively movable fields. The motor disclosed in said patent has series winding characteristics and the armature speed varies with the applied load.

An object of this invention is a dynamo electric machine of the shunt wound type or of the continuation wound type having a duplex armature and relatively movable fields in which the armature retains its rated speed irrespective of load variation.

In dynamo electric machines embodying the invention, the armature winding is in two sections, one section being arranged in slots in the outer surface of a rotor and the other section being arranged in slots in the inner surface of the rotor, the turns of the armature windings lying in planes substantially perpendicular to radii of the rotor, there being a magnetically neutral cylindrical area between the two sections. The inner and outer armature winding sections may be differently connected according to the use to which the motor is to be put and in some cases may be independent of each other.

Other objects, novel features and advantages of this invention will become apparent from the following specification and accompanying drawings, wherein:

Fig. 2 is a section on the line 2—2 of Fig. 1;

Fig. 3 is a section on the line 3—3 of Fig. 1;

Fig. 4 is a section on the line 4—4 of Fig. 1, and

Figs. 5 to 10 are circuit diagrams of different armature windings.

Figure 1:
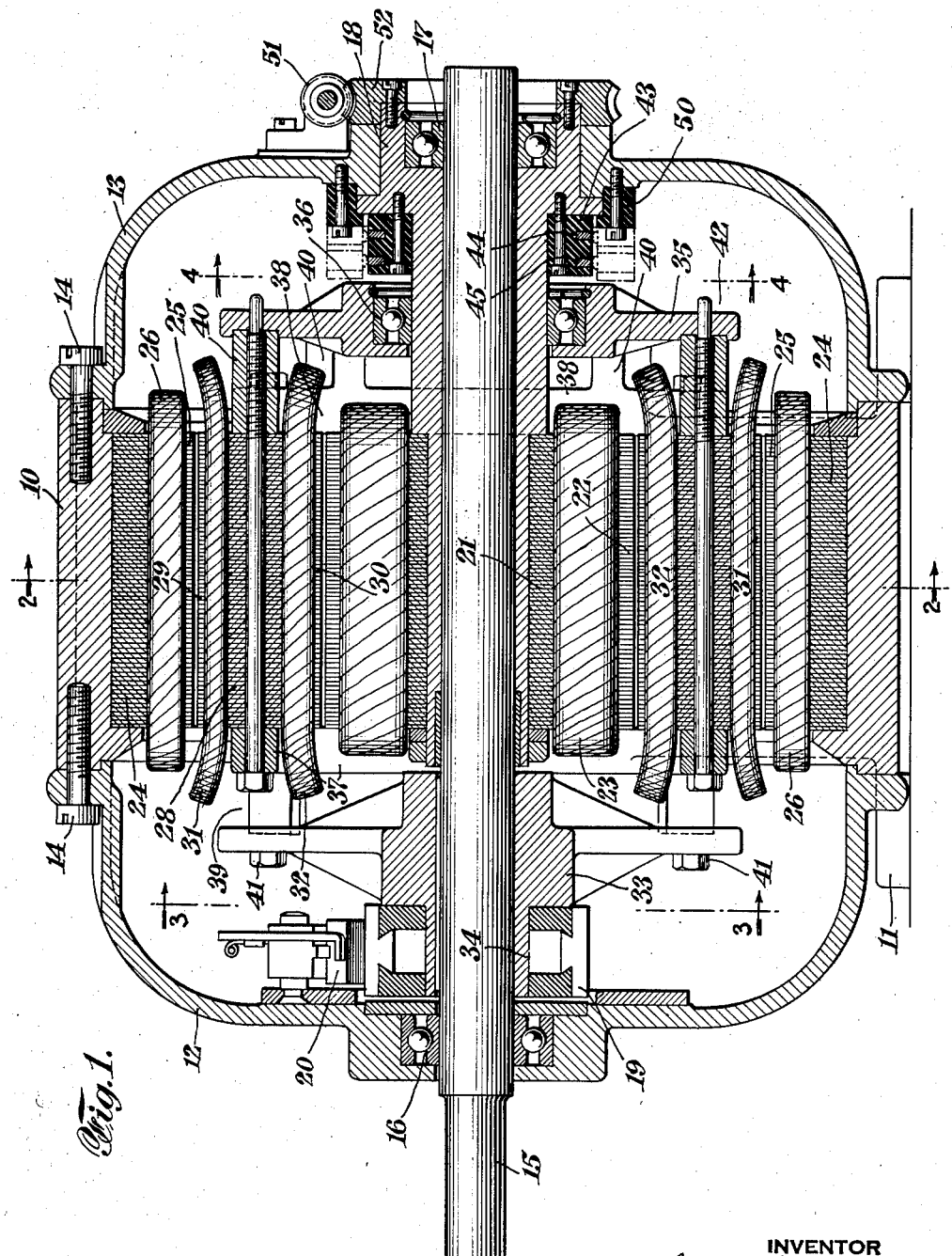
Fig. 1 is a vertical section through a dynamo electric machine embodying the invention.

As shown in Fig. 1, an annular housing 10 rests upon a base 11 and has ends 12 and 13 attached thereto by bolts 14. A shaft 15 is journaled in bearings 16 and 17, the bearing 16 being supported by the end member 12 while the bearing 17 is supported by a sleeve 18 surrounding the shaft 15 and being in turn supported by the end 13. On the left end of the shaft is provided a commutator 19 which cooperates with the brushes 20 in the usual manner.

The inner field comprises a metal cylinder 21 preferably composed of laminations and provided with radially extending slots 22 in which are provided the customary field windings 23, which are preferably arranged to produce four poles. The inner field is rigidly mounted on the sleeve 18 for rotary movement therewith. The outer field 24 is carried by the housing 10 and preferably is made up of annular laminations having inwardly facing slots 25 in which are arranged the customary windings 26, which form the same number of poles as are in the inner field. The outer field 24 is stationary in the casing.

The armature 28 is annular and is arranged between the inner and outer field sections and preferably is made up of laminations having outwardly facing slots 29 and inwardly facing slots 30 in which are provided windings 31 and 32 having their turns arranged in planes substantially perpendicular to radii of the armature. A spider 33 is keyed to the shaft 15 and has a hub 34 on which the commutator 19 is mounted. A second spider 35 is supported from the sleeve 18 by a ball bearing 36. Pressure rings 37 and 38 bear against the opposite sides of the armature and are provided with lugs 39 and 40 which seat in recesses in the spiders 33 and 35 respectively. A bolt 41 passes through each arm of the spider 33, the lug 39 associated therewith, the laminations of the armature and is threaded into a tapped socket in the pressure ring 38 intermediate two lugs 40. Bolts 42 pass through apertures in the pressure ring 37 intermediate the lugs 39, through the laminations of the armature and are threaded into tapped sockets in the lugs 40 of the pressure ring 38. The tip of each bolt 42 is smooth and of less diameter than the threaded portion and extends beyond the end of the lug 40 into a smooth socket in the spider 35. The armature may be removed from between the fields by unscrewing the bolts 14 which fasten the end 12 to the casing 10 and withdrawing the shaft 15, the commutator 19, the spider 33, bolts 41 and 42, and the armature 28 with their laminations rigidly clamped between the rings 37 and 39, the tips of the bolts 42 sliding out of the sockets in the spider 35.

An annulus 43 of insulating material is mounted on the sleeve 18 for rotation therewith and in the annulus are embedded two metal rings 44 and 45, each composed of two nearly semi-circular sections, there being gaps between the adjacent ends of said sections. Spring-pressed contact members 46, 47, 48, 49, 50 and 51 are supported from the end 13 by the annular insulator 50 in position to contact with the rings 44 and 45. The contacts 46 and 47 are arranged diametrically opposite the contacts 48 and 49 respectively and the contacts 46 and 48 are engageable with the ring sections 44a and 44b according to the direction of rotation of the sleeve 18 while the contacts 47 and 49 are similarly engageable with the ring sections 45a and 45b. The contacts 50 and 51 are diametrically opposite each other and engage the ring sections 45a and 45b respectively. In one position of the sleeve 18, all four contacts 46, 47, 48 and 49 are opposite the gaps in their co-operating rings and therefore are out of electrical engagement with such rings.

Means consisting of a worm 51 and a worm wheel 52 are provided for rotating the sleeve 18, but it is to be understood that any other suitable means may be used for this purpose.

When the sleeve 18 is in the position shown in Fig. 3, the contacts 46, 47, 50 and 51 are out of electrical engagement with the rings 44 and 45 and no current flows through the field and armature windings. Rotation of the sleeve in either direction from this position will cause flow of current through such windings and will move the poles of the inner field relative to poles of the outer field. The direction of rotation of the armature will depend upon the direction of flow of current through the various windings and the direction of flow is determined by the order of engagement between the ring sections and contact members. The speed depends upon the orientation of the two field sections and will vary with rotation of the inner field through 90° at which maximum variation is obtained. A motor constructed in accordance with the invention above will maintain the same speed under load as without load.

Figure 5:
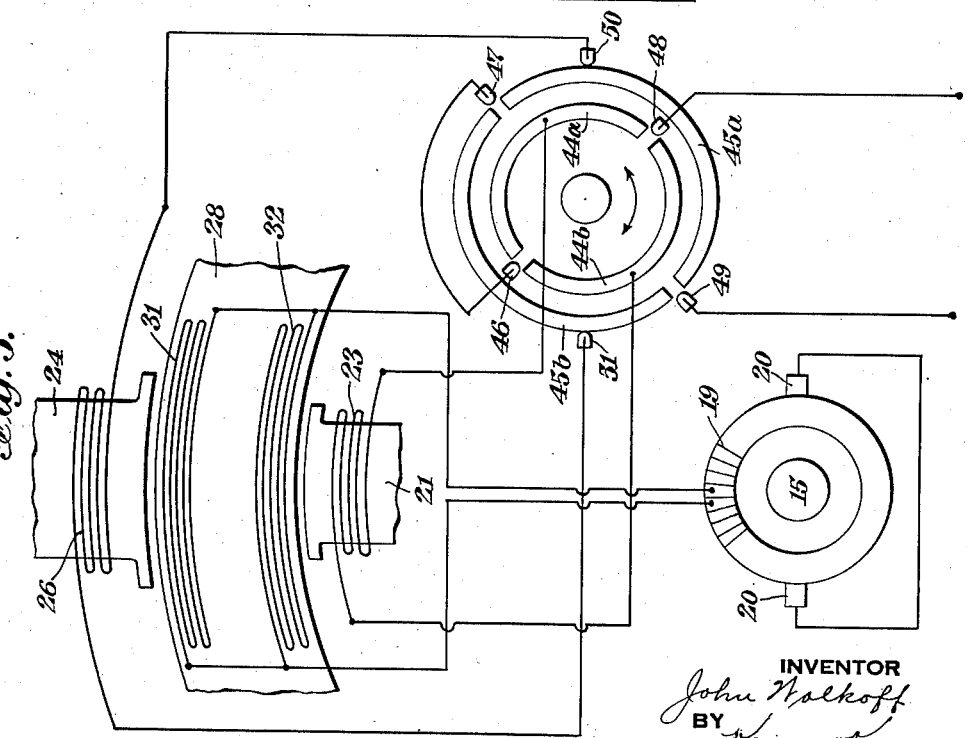

Figs. 5 to 10 inclusive are circuit diagrams of different forms of armature and field connections. In Fig. 5, the contacts 48 and 49 are connected to the two wires of a power line and the contacts 46 and 47 are connected to each other. The winding 26 for each pole of the outer field is connected between the contacts 50 and 51 while the winding 23 for each pole of the inner field is connected between the ring sections 44a and 44b. The armature windings 31 and 32 are connected in parallel to the commutator 19 and the brushes 20 of the commutator are connected to each other.

Figure 6:
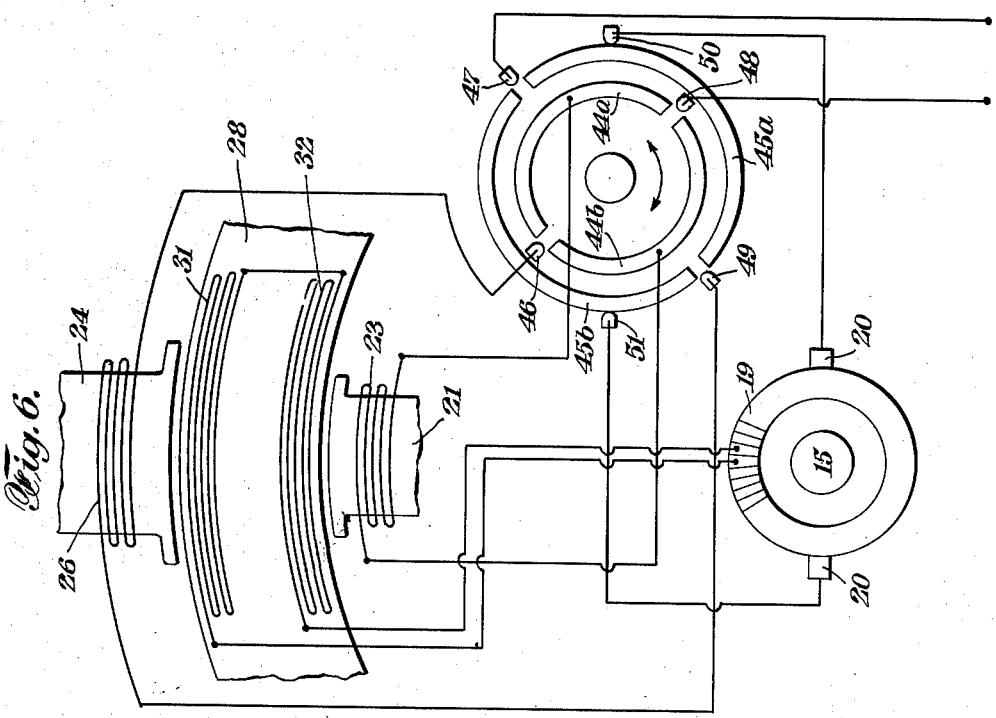

In Fig. 6, the brushes 47 and 48 are connected to the power line while the brushes 20 of the commutator 19 are connected between the contacts 50 and 51. The winding 26 of each pole of the outer field is connected between the contacts 46 and 49 while the winding 23 for each pole of the inner field is connected between the ring sections 44a and 44b. The armature windings 31 and 32 are connected in series with the commutator.

In Figs. 7 and 8, one brush 20 and the contacts 48 and 49 are connected to a three-wire power line while the remaining brush 20 is connected to both contacts 46 and 47. The winding 26 for each pole of the outer field is connected between the contacts 50 and 51 while the winding 23 for each pole of the inner field is connected between the rings 44a and 44b.

In Fig. 7, the armature windings 31 and 32 are connected in series with the comutator while in Fig. 8, the armature windings are connected in parallel to the commutator. Either two-phase or three-phase alternating current may be used with either of the above-described arrangements.

In Fig. 9, one brush 20 and contacts 47, 48 and 49 are connected with a four-wire supply line while the remaining brush 20 is connected to the contact 46. The winding 26 for each pole of the outer field is connected between the contacts 50 and 51 while the winding 23 for each pole of the inner field is connected between the ring sections 44a and 44b. The armature windings 31 and 32 are arranged for two-phase current and while they are shown as connected in parallel with the commutator 19, they may also be connected in series with the commutator.

In Fig. 10 is disclosed the windings for a rotary converter embodying the invention. The contacts 47 and 49 are connected to a two-wire alternating current line and direct current is delivered from the contact 48 and one brush 20 to an outgoing line. The other brush 20 is connected to the contact 46. The winding 26 of each pole of the inner field is connected between the contacts 50 and 51 while the winding 23 of each pole of the inner field is connected between the ring sections 44a and 44b. The inner armature winding 32 is connected to the commutator 19. The outer armature winding in this modification is the well-known squirrel cage type and consists of rods 31a supported in slots in the outer periphery of the armature and short-circuited by rings 31b. The outer field and the squirrel-cage winding constitute an induction motor while the inner field and the armature winding 32 constitute a generator of alternating current which is rectified by the commutator 19. Alternately, the inner armature winding may be of the well-known squirrel cage type and the outer armature winding may be connected to the commutator.

It is of course understood that various modifications may be made in the device above described, without in any way departing from the spirit of the invention as defined in the appended claims.

I claim:

1. A dynamo electric machine comprising an annular armature having inner and outer windings, an inner and outer field member between which said armature is arranged, a rotatable member supporting said inner field member, a first and a second two-section ring insulatingly carried by said sleeve, a first pair of contacts engageable with opposite sections of said first ring, pole windings for the outer field member connected between said first pair of contacts, a second pair of contacts engageable by opposite sections of said first ring, a third pair of contacts engageable by opposite sections of said second ring, connections between contacts of the second pair and a contact of the third pair, pole windings for the outer field member connected between the sections of the second ring, an armature rotatable with said commutator, brushes for said armature, connections between said brushes, and parallel connections between said inner and outer armature windings and said commutator, the remaining contacts of the second and third pair being connectible to feed wires.

2. A dynamo electric machine comprising an annular armature having inner and outer windings, an inner and outer field member between which said armature is arranged, a commutator rotatable with said armature, series connections between said inner and outer armature windings and said commutator, a rotatable member supporting the inner field member, a first and second two-ring section insulatingly supported by said rotatable member, a first pair of contacts engageable with opposite sections of said first ring, connections between the commutator brushes and said first pair of contacts, a second pair of contacts engageable with opposite sections of said first ring, a third pair of contacts engageable with opposite sections of said second ring, pole windings for the outer field member connected between one contact of the second pair and one contact of the third pair, and pole windings for the inner field member connected between the sections of said second ring, the remaining contacts of the second and third pair being connectible to feed wires.

3. A dynamo electric machine comprising an annular armature having inner and outer windings, an inner and outer field member between which said armature is arranged, a commutator rotatable with said armature, series connections between said inner and outer armature windings and said commutator, a rotatable member supporting the inner field member, a first and second two-ring section insulatingly supported by said rotatable member, a first pair of contacts engageable with opposite sections of said first ring, pole windings for the outer field member connected between said first pair of contacts, a second pair of contacts engageable with opposite sections of the first ring, and a third pair of contacts engageable with opposite sections of the second ring, connections between one brush of the commutator and both contacts of the second pair and a contact of the third pair, and pole windings for the inner field member connected between opposite sections of said second ring, the remaining contacts of the second and third pair and the remaining brush being connectible to feed wires.

4. A dynamo electric machine according to claim 3 in which the armature windings are arranged for two-phase alternating current, and the inner and outer windings are series connected.

5. A dynamo electric machine according to claim 3 in which the armature windings are arranged for three-phase alternating current and the inner and outer windings are parallel connected.

6. A dynamo electric machine comprising an annular armature having inner and outer windings, an inner and outer field member between which said armature is arranged, a commutator rotatable with said armature, series connections between said inner and outer armature windings and said commutator, a rotatable member supporting the inner field member, a first and second two-ring section insulatingly supported by said rotatable member, a pair of contacts engageable with opposite sections of said first ring, pole windings for the outer field member connected between said first pair of contacts, a second pair of contacts engageable with opposite sections of said first ring, a third pair of contacts engageable with opposite sections of said second ring, a connection from one commutator brush to one contact of the third pair, and pole windings for the inner field member connected between opposite sections of said second ring, the remaining contacts of the third pair and the second pair of contacts and the remaining brush being connectible to feed wires.

7. A dynamo electric machine according to claim 6 in which the armature windings are arranged for two-phase alternating current, and the inner and outer windings are parallel connected.

8. A dynamo electric machine comprising inner and outer field members, a rotatable member supporting the inner field member, an armature interposed between said field members and having an external squirrel cage winding and an internal winding having its coils perpendicular to armature radii, a commutator rotatable with said armature, connections between said inner armature winding and said commutator, brushes for said commutator, a first and a second two-section ring insulatingly carried by said rotatable member, a first pair of contacts engageable with opposite sections of said first ring, a second pair of contacts engageable with opposite sections of said first ring, pole windings for the outer field member connected between said second pair of contacts, a third pair of contacts engageable with said second ring, connections between one commutator brush and one of the third pair of contacts, and pole windings for the inner field member connected between opposite sections of said second ring.

9. A dynamo electric machine comprising inner and outer field members, a rotatable member supporting the inner field member, a shaft coaxial with said rotatable member, a spider fixed to said shaft, a second spider rotatably mounted on said rotatable member, an armature interposed between said field members, and supporting members for said armature extending between said spiders.

10. A dynamo electric machine comprising inner and outer field members, a rotatable member supporting the inner field member, a shaft coaxial with said rotatable member, a spider fixed to said shaft, a second spider rotatably mounted on said rotatable member, an armature interposed between said field members, armature pressure rings carried by said spiders and engaging said armature and supporting members for said armature extending between said spiders.

11. A dynamo electric machine comprising inner and outer field members, a rotatable member supporting the inner field member, a shaft coaxial with said rotatable member, a spider fixed to said shaft, a second spider rotatably mounted on said rotatable member, an armature interposed between said field members, a pressure ring at each end of the armature, bolts carried by the first spider and extending through said armature and having their ends threaded into tapped sockets in the opposite pressure ring, and additional bolts alternately arranged with respect to said first named bolts and passing through a pressure ring and said armature and having threaded connection with the opposite pressure ring, said additional bolts having smooth surface tips extending into smooth surface sockets in said second spider.

12. A dynamo electric machine comprising inner and outer field members, a rotatable member supporting the inner field member, an armature interposed between said field members, and having a squirrel cage winding and a second winding with its coils perpendicular to the armature radii, one of said windings being arranged on the external surface of the armature and the other winding being arranged on the internal surface of the armature, a commutator rotatable with said armature, connections between said commutator and said second named armature winding, brushes for said commutator, a first and a second two-section ring insulatingly carried by said rotatable member, a first pair of contacts engageable with opposite sections of said first ring, a second pair of contacts engageable with opposite sections of said first ring, pole windings for the outer field member connected between said second pair of contacts, a third pair of contacts engageable with said second ring, connections between one commutator brush and one of the third pair of contacts, and pole windings for the inner field member connected between opposite sections of said second ring.

JOHN WOLKOFF.